Nov. 8, 1966 J W HAMBY 3,283,830
ROD WEEDER WITH ENCLOSED, DUST-TIGHT CHAIN DRIVE
Filed Aug. 28, 1964 2 Sheets-Sheet 1
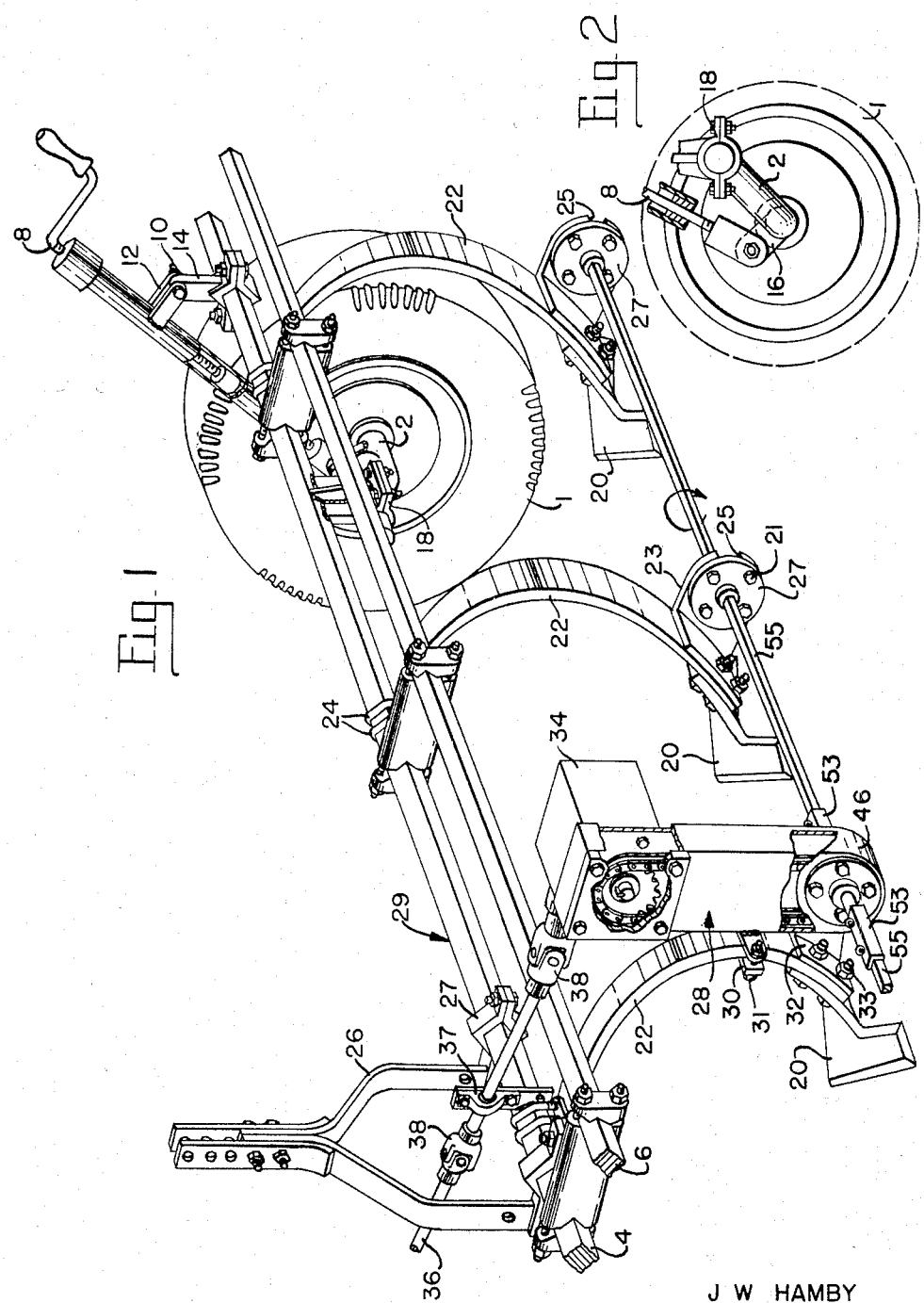
J W HAMBY
INVENTOR.
BY
Wayland D. Keith
HIS AGENT Nov. 8, 1966  J W HAMBY  3,283,830
ROD WEEDER WITH ENCLOSED, DUST-TIGHT CHAIN DRIVE
Filed Aug. 28, 1964  2 Sheets-Sheet 2
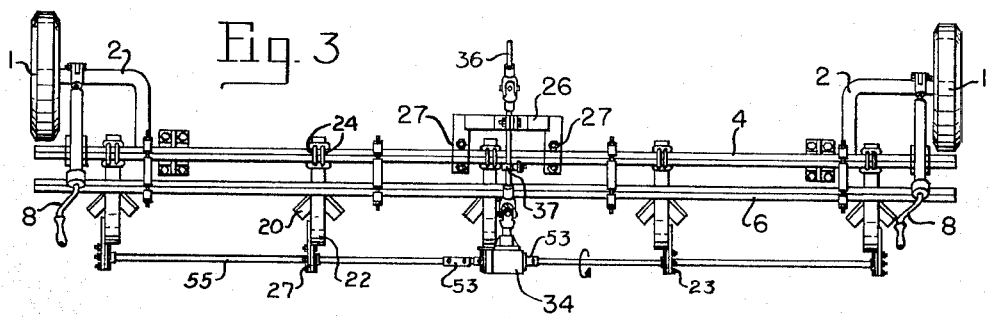
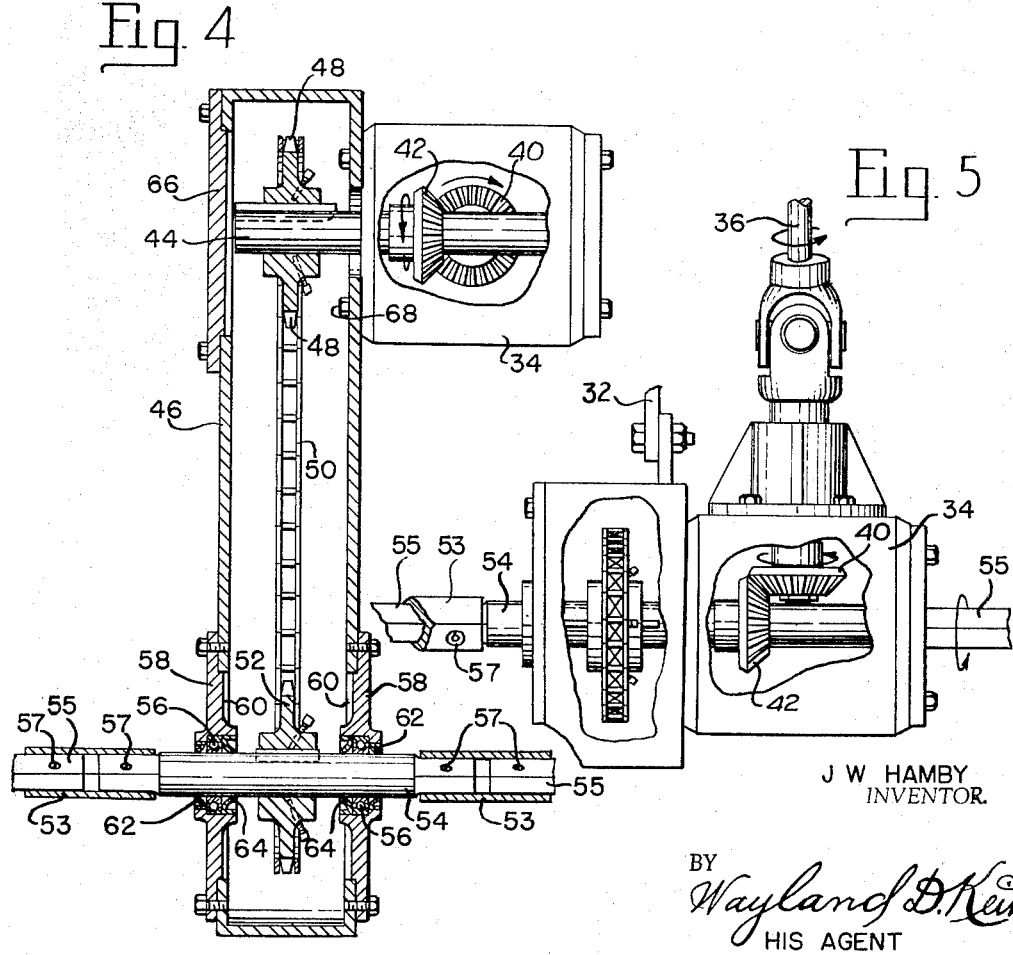
J W HAMBY
INVENTOR.
BY
Wayland D. Keith
HIS AGENT

United States Patent Office 3,283,830
Patented Nov. 8, 1966

3,283,830
ROD WEEDER WITH ENCLOSED, DUST-TIGHT CHAIN DRIVE
J W Hamby, 2900 W. 5th St., Plainview, Tex.
Filed Aug. 28, 1964, Ser. No. 392,759
1 Claim. (Cl. 172—44)

This invention relates to rod weeders and more particularly a chain driven rod weeder, enclosed within a dust tight housing, the chain drive mechanism of which enables the power to drive the rod weeder to be delivered from the power take-off of a tractor through a power take-off shaft to a bevel gear box which is a substantial distance above the ground.

Various rod weeders have been proposed heretofore, but these for the most part, utilized chains which were exposed to the dust laden air, and since the nature of the work performed by the rod weeder makes the air dust laden with abrasive material, the present device is much more desirable to use under such conditions than the conventional rod weeders.

The present rod weeder has a transversely elongated wheeled frame on which an elongated, squared rod is arranged transversely to the line of travel, which rod is adapted to rotate at a relatively high speed, when desired, and which rod travels transversely below the soil level so as to mulch the soil and dislocate plant growth that is rooted within the soil.

An object of this invention is to provide a tractor operated rod weeder which is driven by a power take-off shaft, which shaft extends into a closed bevel gear housing in such manner as to exclude dirt and dust from the gear housing. The gear housing is fitted in dust-tight relation on an upright closed rod weeder chain housing in such manner as to exclude dust and dirt therefrom.

Another object of the invention is to provide a rod weeder, the row of which may be readily attached to or detached from an implement without having to disassemble the implement.

Still another object of the invention is to provide a rod weeder attachment for a tractor, either end of which rod weeder attachment may be readily adjusted relative to the surface of the terrain.

Still another object of the invention is to provide a tractor mounter, rod weeder for attachment to a tractor, which rod weeder is simple in construction, easy to operate, low in cost of manufacture, easy to assemble and disassemble for care and maintenance.

A further object of the invention is to provide a tractor operated, power take-off driven rod weeder attachment for a tractor, which attachment is supported on independent wheels, and is towed behind the tractor, which rod weeder attachment may be raised and lowered by the hydraulic system of the tractor.

With these objects in mind and others which will become manifest as the description proceeds, reference is to be had to the accompanying drawings in which like reference characters designate like parts in the several views thereof, in which:

FIG. 1 is a perspective view of a fragmentary portion of the rod weeder shown apart from a tractor and showing a fragmentary portion of the power take-off shaft which is adapted to be connected to a tractor, with parts broken away and shown in section to bring out the details of construction;

FIG. 2 is a fragmentary view, on a reduced scale, of the lower portion of the adjusting mechanism used to adjust the position of the ground engaging wheels of the rod weeder relative to the terrain, the adjustment of which will vary the depth at which the rod weeder operates;

FIG. 3 is a top plan view of the rod weeder on a reduced scale, showing the power take-off shaft extending from the bevel gear housing to a point ahead of the rod weeder for connection with a power take-off of a tractor;

FIG. 4 is an enlarged vertical, sectional view taken medially through the chain housing and showing the bearings, dust seals, sprockets and chain, and also showing a break-away portion of a bevel gear housing, with the bevel gears therein; and FIG. 5 is an enlarged fragmentary plan view showing a portion of the power take-off drive shaft, showing the bevel gear housing and the chain housing, with portions of the housings being broken away to show the gears, the upper sprocket and the chain therein, and showing a portion of the rod of the rod weeder extending outward on each side of the chain and sprocket housing.

With more detailed reference to the drawings, the numeral 1 designates ground support wheels, which wheels are mounted on off-set, pivoted, crank-like axles 2 so as to enable the raising and lowering of the implement tool bars 4 and 6 by the manipulation of a screw jack mechanism 8, a portion of which is connected to tool bar 4 by a bolt 10 which passes through lugs 12 on the jack mechanism and lugs 14 on the tool bar. The other end of each screw jack mechanism 8 is connected to a lever 16, which lever is secured to each axle 2 so that the axles 2 will pivot within bearings 18, which bearings are secured to the lower side of tool bar 4. This screw jack arrangement 8 enables the tool bars 4 and 6 to be raised substantially vertically, so as to properly adjust plows 20 which are mounted on plow beams 22, which beams 22 are secured to tool bar 4 by clamps 24. The plow beams 22 on each side of the center plow beam 22 each has a rearwardly extending bracket 23 mounted on the lower end thereof, each of which brackets is bifurcated on the rear side thereof, as indicated at 25, to receive the rods 55 of the rod weeder therein, which rods are journaled in bearings mounted in bearing support plates 27, which plates 27 are secured to brackets 23 by bolts 21.

Tractor power lift yoke member 26 is mounted on and secured to tool bar 4 by clamps 27, which yoke extends upward therefrom to enable the entire rod weeder implement, generally designated by the numeral 29, to be raised or lowered in a conventional manner as is well known in power lifts.

A chain drive mechanism, generally designated by the numeral 28, is secured to one of the plow beams 22 by a clamp 30 and a bracket 32 so as to maintain the mechanism in upright position, as will best be seen in FIG. 1. The housing of chain drive mechanism 28 has a bevel gear housing 34 secured thereto, as will best be seen in FIGS. 4 and 5. The bevel gear housing 34 has connected thereto a power take-off drive shaft 36, which drive shaft has universal joints 38 therein intermediate a tractor (not shown) and the bevel gear housing 34. The drive shaft 36, which is connected to the tractor, is connected in driving relation with the gears 40–42 in the bevel gear housing 34. The bevel gear housing 34 has bevel gears 40 and 42 therein which are in meshed driving relation to drive a shaft 44, which shaft extends into the housing 46 which encloses the sprocket and chain driving mechanism, which comprises a drive sprocket 48, a drive chain 50, and a driven sprocket 52, which sprocket 52 is mounted in the lower end of housing 46. The sprocket 52 is mounted on shaft 54 which shaft is journaled within bearings 56. Each end of shaft 54 is squared to receive a squared coupling 53 thereon, each of which couplings also complementally receives an end of each square of polygonal rod 5. Pins 57 pass through holes in the respective couplings 53 and through a hole in each adjacent end of each shaft 54 and 55. The bearings 56 are fitted within removable side plates 58, which plates are piloted within aligned bores 60 within housing 46. Dust seals 62 are provided exterior of each of the bearings 56 and an oil seal 64 is provided inwardly of each of the bearings 56 so as to enable the sprockets and chain to be maintained in the oil and dust-tight chamber or housing 46. The bores 60 in housing 46 are of greater diameter than sprocket 52. The removable side plates 58 are of such size as to cover each of the bores 60, so, by removing the side plates 58, the sprocket 52 and shaft 54 may be readily removed from housing 46.

A cover plate 66 covers an opening in the upper end of housing 46 in such manner that, when the plate 66 is removed, access may be had to sprocket 48 and to cap screws 68 which maintain the bevel gear housing 34 in secure relation to the housing 46.

The power take-off drive shaft 36 is preferably journaled in a bearing 37 mounted on the tool bar 4.

*Operation*

With the power take-off yoke 26 connected to a power lift of a tractor in a conventional manner, and with the power take-off drive shaft 36 connected in operative relation with the power take-off of the tractor, the power take-off shaft 36 is rotated, which in turn rotates bevel gear 40, which in turn will rotate bevel gear 42, enmesh therewith, to drive shaft 44, which shaft 44 is keyed to the bevel gear 42 and to a sprocket 48. The sprocket 48 will drive chain 50 and sprocket 52 to rotate shaft 54 to which squared rods 55 are connected by squared couplings 53. The rods 55 are rotated in the direction indicated by the arrow, FIG. 1, which movement of rods will uproot grass, weeds, and vegetation as the squared rods 55 are moved transversely through the soil below the surface thereof.

The plows 20 will open furrows, one of which furrows will permit the lower end of housing 46 to be in a furrow below the normal surface of the soil and with the rods 55 extending outward in each direction therefrom, the rods will mulch the soil and tend to give a leveling action to the terrain.

Bearing support brackets 23 are secured to the rear side of each plow beam 22 by bolts 31, and each plow beam 22 has a slot 25 therein, as will best be seen in FIG. 1, so that by loosening bolts 21, the bearing support plates 27, and the squared rods 55 may be readily removed rearwardly from bifurcated brackets 23, together with chain drive mechanism 28 which is attached to central beam 22 by bolts 31 and 33, and by disconnecting the rearmost universal joint 38, the rod weeder unit may be removed in assembled relation in a few minutes' time and likewise replaced, in a minimum of time, by reversing the procedure.

Having thus clearly shown and described the invention, what is claimed as new and is desired to be secured by Letters Patent is:

A rod weeder for attachment to a tractor, having a power lift and a power take-off, which rod weeder comprises;
(a) a transversely elongated frame,
(b) means detachably connecting said rod weeder frame to the power lift mechanism of the tractor,
(c) a bevel gear unit mounted on said transversely elongated frame,
(d) a housing for said bevel gear unit,
(e) a drive shaft connecting said bevel gear unit and the power take-off of the tractor in driving relation,
(f) a shaft extending laterally outward from said housing of said bevel gear unit,
(g) a dust-tight housing secured to the side of said bevel gear unit housing from which said lateral shaft extends,
(h) a sprocket mounted on and secured to said lateral shaft and being positioned within said dust-tight housing,
  (1) said dust tight housing extending downwardly from said bevel gear unit housing,
(i) a shaft journaled in said dust-tight housing near the lower end thereof and extending outward on each side of said housing in parallel relation to said transversely elongated frame,
(j) a sprocket mounted on and secured to said shaft journaled in said dust-tight housing near the lower end thereof,
(k) a drive chain surrounding said sprockets in driving relation,
(l) plow beams mounted on said transversely elongated frame, at spaced intervals therealong and extending downwardly therefrom,
  (1) each said plow beam being adapted to open a furrow,
(m) a polygonal, elongated rod extending axially outward from each end of said transverse shaft in the lower end of said dust-tight housing,
(n) a rearwardly extending bracket secured to each said plow beam so at least a portion of each bracket is below the normal surface of the terrain,
  (1) a bearing mounted on each said bracket of each plow beam below the normal surface of the terrain to journal said polygonal rods for rotary movement,
  (2) each rearwardly extending bracket having a bifurcated opening formed therein through which each said opening said polygonal rod may be moved transversely, without the removal of the shaft from the bearings,
  (3) each said bracket having holes formed therein, which holes are spaced around the bifurcated opening thereof,
(o) an apertured plate mounted on each said bracket on the respective plow beams, so the respective apertures in said plates will register with the holes in each said bracket,
  (1) each bearing on each plow beam being mounted on each said apertured plate thereof,
  (2) bolt means detachably connecting each said plate to each said bracket, and
(p) detachable connecting means connecting said transverse shaft, journaled in said dust-tight housing near the lower end thereof, with said polygonal rods.

References Cited by the Examiner

UNITED STATES PATENTS

| | | | |
|---|---|---|---|
| Re. 21,702 | 1/1941 | Pomeroy | 308—178 |
| 1,815,331 | 7/1931 | Robinson | 172—44 |
| 2,093,070 | 9/1937 | Bloom et al. | 172—44 |
| 2,277,635 | 3/1942 | Dalaval-Crow | 308—36.1 |
| 2,318,097 | 5/1943 | Richmond | 172—44 X |
| 2,331,652 | 10/1943 | Buckendale | 308—172 |
| 2,638,830 | 5/1953 | Kropp | 172—125 X |
| 2,892,504 | 6/1959 | Mowbray | 172—44 |
| 2,954,085 | 6/1960 | Roberts | 172—44 |
| 3,108,642 | 10/1963 | Hunter | 172—44 |

FOREIGN PATENTS 741,506   12/1932   France.

ABRAHAM G. STONE, *Primary Examiner.*

R. L. HOLLISTER, F. B. HENRY, *Assistant Examiners.*